United States Patent
Schmidt et al.

(10) Patent No.: US 11,101,706 B2
(45) Date of Patent: Aug. 24, 2021

(54) ROTOR FOR AN ELECTRIC MACHINE HAVING A SHEET METAL FOR SECURING A POLE SHOE TO A SHAFT

(71) Applicant: SIEMENS AKTIENGESELLSCHAFT, Munich (DE)

(72) Inventors: Stefan Schmidt, Bernau OT Schönow (DE); Benjamin Gottfried Ulbrich, Berlin (DE); Martin Wieschalla, Berlin (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 343 days.

(21) Appl. No.: 16/080,222

(22) PCT Filed: Nov. 16, 2016

(86) PCT No.: PCT/EP2016/077802
§ 371 (c)(1),
(2) Date: Aug. 27, 2018

(87) PCT Pub. No.: WO2017/148549
PCT Pub. Date: Sep. 8, 2017

(65) Prior Publication Data
US 2019/0020233 A1     Jan. 17, 2019

(30) Foreign Application Priority Data

Feb. 29, 2016 (EP) .................................... 16157877
Mar. 7, 2016 (EP) .................................... 16158921

(51) Int. Cl.
H02K 1/24          (2006.01)
H02K 1/30          (2006.01)
(Continued)

(52) U.S. Cl.
CPC ................. *H02K 1/24* (2013.01); *H02K 1/30* (2013.01); *H02K 15/022* (2013.01); *H02K 19/02* (2013.01)

(58) Field of Classification Search
CPC ........ H02K 1/24; H02K 1/30; H02K 15/0043; H02K 15/022; H02K 19/02
(Continued)

(56) References Cited

U.S. PATENT DOCUMENTS 9,077,223 B2    7/2015  Imura et al.
2003/0141776 A1 7/2003  Hamilton et al.
(Continued)

FOREIGN PATENT DOCUMENTS

CN      104114314 A    10/2014
DE      4415224 A1     11/1995
(Continued)

OTHER PUBLICATIONS

Wolfgang et al., English Machine Translation of DE4415224 (Year: 1995).*
(Continued)

*Primary Examiner* — Tulsidas C Patel
*Assistant Examiner* — Rashad H Johnson
(74) *Attorney, Agent, or Firm* — Henry M. Feiereisen LLC (57) ABSTRACT

The invention relates to a rotor (3) for an electric rotating machine (1), in particular a synchronous machine (20), comprising a shaft (5) and at least one pole shoe (7). In order to keep overhead and costs low while achieving high reliability, according to the invention, a metal sheet (8) is placed between the shaft (5) and the pole shoe (7); said metal sheet (8) has a first contact area (12) that is in contact with a contact area (14) on the pole shoe (7), the metal sheet (8) and the pole shoe (7) being made of different materials.

36 Claims, 4 Drawing Sheets

(51) Int. Cl.
*H02K 15/02* (2006.01)
*H02K 19/02* (2006.01)
(58) Field of Classification Search
USPC .... 310/125, 154.35, 156.33, 156.48, 156.55, 310/156.59, 156.61, 185, 216.079, 310/216.091, 216.098, 216.116
See application file for complete search history.

(56) References Cited

U.S. PATENT DOCUMENTS

| | | | |
|---|---|---|---|
| 2015/0228300 A1 | 8/2015 | Sugi et al. | |
| 2016/0380491 A1* | 12/2016 | Krompasky | H02K 1/32 310/179 |
| 2019/0020233 A1* | 1/2019 | Schmidt | H02K 1/24 |
| 2019/0319502 A1* | 10/2019 | Festa | H02K 15/022 |
| 2019/0363593 A1* | 11/2019 | Kummlee | H02K 1/28 |

FOREIGN PATENT DOCUMENTS

| | | | |
|---|---|---|---|
| GB | 458381 A | 12/1936 | |
| JP | H0984286 A | 3/1997 | |
| RU | 2007817 C1 | 2/1994 | |

OTHER PUBLICATIONS

International Search Report issued by the European Patent Office in International Application PCT/EP2016/077802.

\* cited by examiner

ROTOR FOR AN ELECTRIC MACHINE HAVING A SHEET METAL FOR SECURING A POLE SHOE TO A SHAFT

CROSS-REFERENCES TO RELATED APPLICATIONS

This application is the U.S. National Stage of International Application No. PCT/EP2016/077802, filed Nov. 16, 2016, which designated the United States and has been published as International Publication No. WO 2017/148549 and which claims the priorities of European Patent Applications, Serial No. 16157877.8, filed Feb. 29, 2016, and 16158921.3, filed Mar. 7, 2016, pursuant to 35 U.S.C. 119(a)-(d).

BACKGROUND OF THE INVENTION

The invention relates to a rotor for an electric rotating machine, in particular a synchronous machine, comprising a shaft and at least one pole shoe.

The invention further relates to an electric rotating machine, in particular a synchronous machine, comprising such a rotor.

The invention further relates to a method for the production of such a rotor.

Such a rotor is used in particular in directly starting synchronous salient pole machines with attached pole shoes. Attached pole shoes appear substantially in large drives with an output of at least 1 megawatt. A joint is formed between the pole shoe and the shaft, to which the pole shoe is attached. With an asynchronous start of the synchronous salient pole machine, eddy currents are induced into the attached pole shoe, wherein in particular the surface of the pole shoe is significantly heated by the eddy currents. The pole shoes expand in the course of the through-heating. The transverse force resulting therefrom in the joint is kept especially frictionally engaged. If the sticking friction is overcome, a heat-induced relative displacement results in the joint between the pole shoe and the shaft. A relative displacement of this type is in most instances volatile and arbitrary. The mass displacements involved herewith have a negative effect on the balance condition of the rotor and ultimately jeopardize the operation of the motor.

The pole shoes are preferably connected to the shaft by means of screws. The sticking friction in the joint between the pole shoe and shaft is therefore determined by the pretensioning forces and the frictional coefficients. In particular, the frictional coefficients can be influenced by a targeted change in the material properties and surface properties of the frictional partners. But, a direct modification of the material properties and surface properties to the contact areas is only possible to a limited degree, since changes to the base material have a global effect on the functional properties of the components. For local changes to the properties, tools and machines, such as milling machines, ovens, immersion baths etc. would be required in a corresponding size. Consequently, a direct processing of the contact areas is associated with a significant technical and financial outlay.

The patent application U.S. Pat. No. 9,077,223 B2 discloses an electric rotating machine with a salient pole rotor, which has polar bodies. The polar bodies are embodied in one piece from a shaft. The pole shoes form pole heads. Each pole shoe is firmly connected to the associated polar body using a plurality of screws. Each pole shoe or its corresponding polar body has at least one projection or one cut-out, in order to limit a cone-shaped pressure range in a pressure range. A cone-shaped pressure range in a pressure range occurs if the pole shoe is connected to the corresponding polar body using the screws.

The patent application DE 44 15 224 A1 discloses an electric machine with a pole wheel having a number of poles, in which for each pole there is provision for a pole body, connected in one piece with the yoke, with an exciter winding surrounding the same and a pole shoe arrangement fastened to the end of the pole body by means of screws. In this regard the interception of the centrifugal forces occurring during the rotation of the pole wheel and acting on the pole shoe arrangement and the exciter winding is to be designed to be more effective. To this end, the pole shoe arrangement comprises a retaining plate screwed onto the pole body and a pole shoe screwed exclusively to the retaining plate. The centrifugal forces occurring by means of the exciter winding are therefore intercepted by the retaining plate.

The object underlying the invention is to specify a rotor for an electric rotating machine, which, compared with the prior art, has a higher reliability and is in such a way easy and cost-effective to produce.

SUMMARY OF THE INVENTION

This object is achieved according to the invention by a rotor for an electric rotating machine, in particular a synchronous machine, comprising a shaft and at least one pole shoe, wherein a metal sheet is disposed between the shaft and the pole shoe, wherein the metal sheet has a first contact area which is in contact with a contact area of the pole shoe and wherein the metal sheet and the pole shoe are formed from different materials.

The object is further achieved by an electric rotating machine, in particular a synchronous machine, having such a rotor.

Furthermore, the object is achieved by a method for producing a rotor for an electric rotating machine, in particular a synchronous machine, wherein the electric rotating machine has a shaft, a pole shoe and a metal sheet, wherein the metal sheet is placed between the pole shoe and the shaft, wherein a first contact area of the metal sheet is in contact with a contact area of the pole shoe, wherein the metal sheet and the pole shoe are produced from different materials.

The advantages and preferred embodiments cited below with respect to the rotor can be transferred analogously to the electric rotating machine and the method.

A metal sheet is a flat roller mill product, in particular made from a metallic material, with a thickness of a few millimeters.

In this regard different materials are understood to mean that the material of the metal sheet, at least in the region of the first contact area of the metal sheet, has a different composition (for instance a different material) or different physical or mechanical properties (for instance hardness, permeability, electrical or thermal conductivity, deformability or surface roughness) than the material of the pole shoe.

By inserting a metal sheet into the joint between the shaft and the pole shoe (the metal sheet is also referred to as joint metal sheet), a local modification of the material properties and/or surface properties can be carried out in the region of the contact areas of the joint metal sheet, preferably with respect to the frictional coefficients, without changes having to be carried out on the pole shoe and the shaft itself. Such a modification to the material properties and/or surface properties will easily and cost-effectively counteract a heat-induced relative displacement between the pole shoe and shaft. The reliability, in particular during operation with an asynchronous start, is improved by using such a rotor.

The first contact area of the metal sheet preferably has a greater surface roughness than the contact area of the pole shoe. A greater surface roughness will increase the frictional coefficient between the contact areas, as a result of which a relative displacement is hampered.

Expediently, the first contact area of the metal sheet has a surface roughness of more than 25 μm, in particular in the range of 60 μm to 80 μm. A surface roughness of this type can be achieved using coarse blasting, for instance. Experience has shown that a surface roughness of this type has proven to be particularly advantageous.

The metal sheet is particularly advantageously formed from a harder material than the pole shoe. This is advantageous, for instance, since the particularly roughened metal sheet made from the harder material interlocks with the softer material of the pole shoe with a corresponding contact pressure, as a result of which a relative displacement between the contacted surfaces is hampered.

The metal sheet is preferably formed from a spring steel with a hardness of at least 650 HV, in particular 700 HV. In particular, a hardened spring steel of the C75S type is used. This is advantageous since the significant hardness allows for a stable interlocking.

With a further advantageous embodiment, the metal sheet has a thickness of at least 2 mm, in particular approx. 5 mm. Experience has shown that a thickness of this type has proven to be particularly advantageous.

With a preferred embodiment, the first contact area of the metal sheet is in full surface contact with the contact area of the pole shoe. By maximizing the contact area, the magnetic flux and the thermal contacting of the pole shoe on the shaft are optimized.

The metal sheet preferably has a second contact area, which is in contact with a contact area of the shaft, wherein the second contact area of the metal sheet has a greater surface roughness than the contact area of the shaft. This is advantageous since no additional measures are therefore required in order for the metal sheet to make contact with the shaft.

The metal sheet is particularly advantageously in contact with the shaft by way of a form-fit and/or force-fit connection, in particular by way of a connecting element. A heating, caused for instance by eddy currents with an asynchronous start, primarily takes place on the surface of the pole shoes. Since the shaft is not significantly heated and does not therefore expand significantly, the metal sheet can be fastened to the shaft, for instance, by way of a simple and cost-effective screw connection.

The metal sheet is particularly advantageously connected to the shaft by way of a positive-fit connection, in particular by way of a welded connection. For instance, the metal sheet is connected to the shaft by way of a diffusion welding method. This is advantageous since a welded connection of this type has significant mechanical and thermal stability.

BRIEF DESCRIPTION OF THE DRAWING

The invention is described and explained in more detail with the aid of the exemplary embodiments shown in the figures, in which.

DETAILED DESCRIPTION OF PREFERRED EMBODIMENTS

The same reference characters have the same meaning in the various figures.

Figure 1:
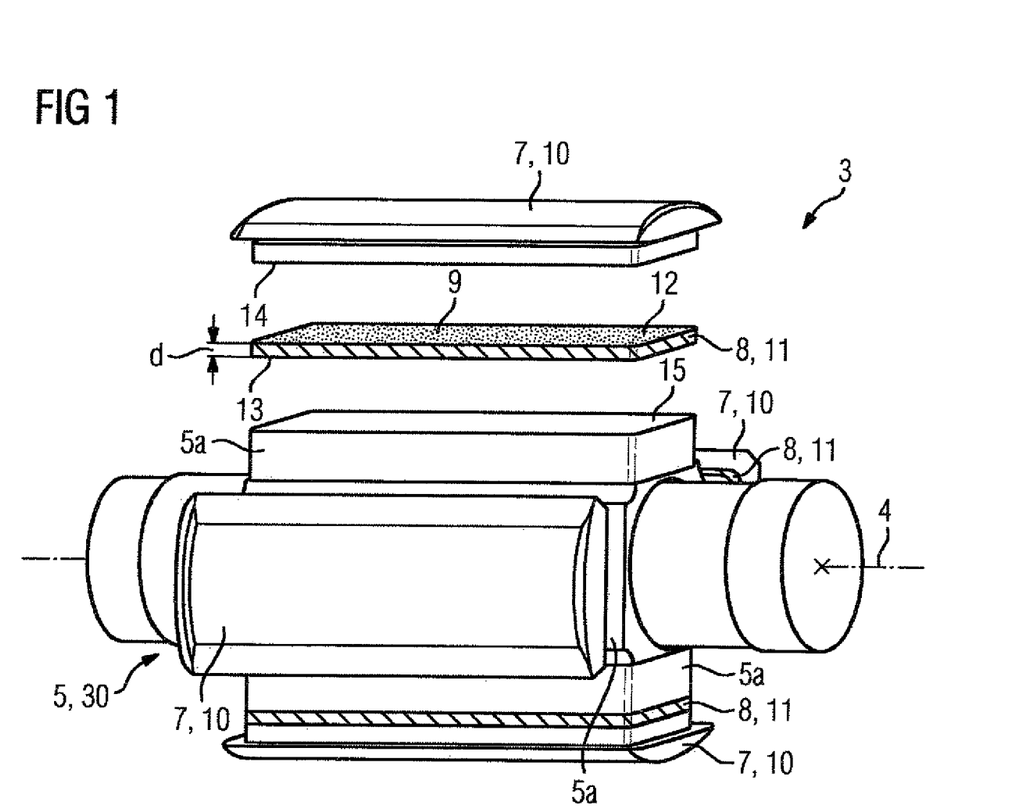
FIG. 1 shows a three-dimensional representation of a first embodiment of a rotor.
Figure 5:
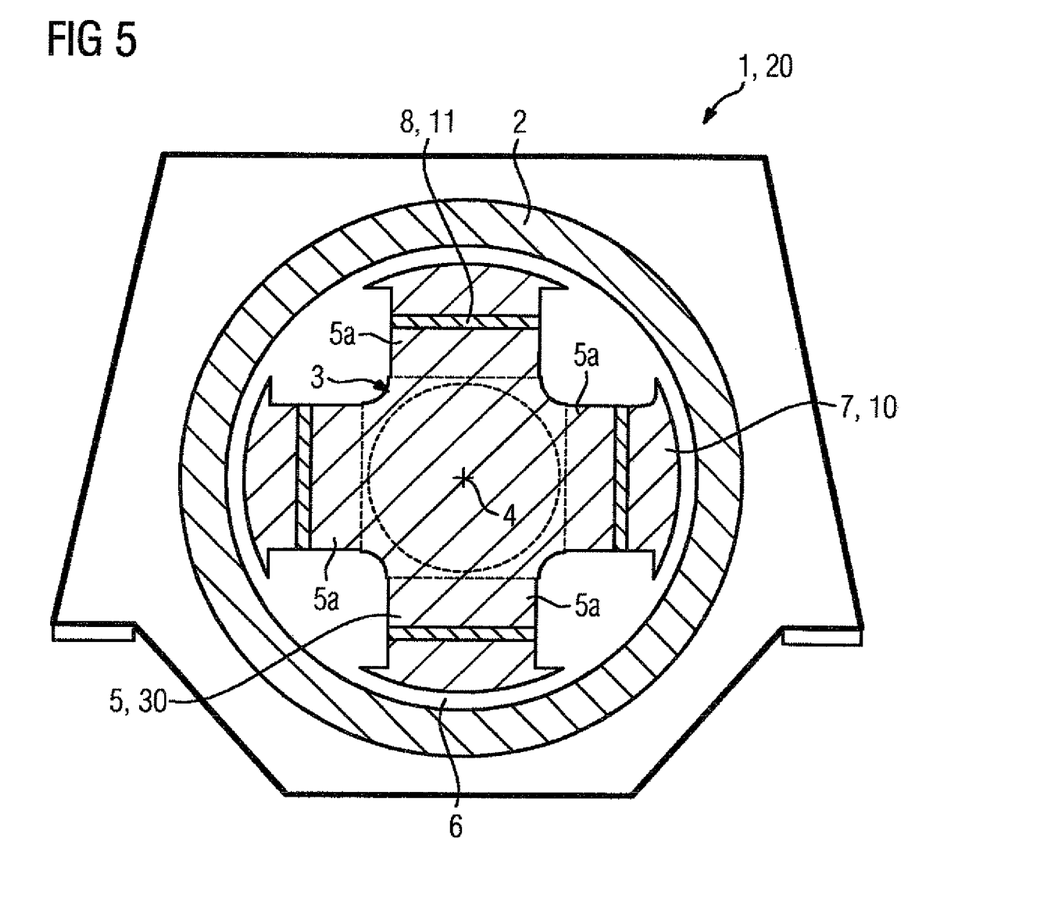

FIG. 1 shows a three-dimensional representation of a first embodiment of a rotor 3. The rotor 3 can be rotated about an axis of rotation 4, wherein the axis of rotation 4 defines an axial direction and a radial direction. The rotor 3, which is suited to a directly starting synchronous salient pole machine (as shown in FIG. 5) with a maximum output of at least 1 megawatt, has a shaft 5 with, by way of example, four orthogonally arranged salient poles 5a, wherein the salient poles 5 are provided with pole shoes 7. The pole shoes 7 consist of a first material 10, in particular of a soft-magnetic steel, in particular of a heat-treated steel. The shaft 5 with the four salient poles 5a is produced from a solid material and in the exemplary embodiment shown consists of a third material 30, preferably a soft-magnetic steel. The first material 10 of the pole shoe 7 can correspond to the third material 30 of the shaft 5.

A metal sheet 8, which runs in the axial direction parallel to the axis of rotation 4, is disposed between each pole shoe 7 and the shaft 5. The metal sheet 8 has a first contact area 12 and a second contact area 13, wherein, in the exemplary embodiment shown, the first contact area 12 rests over the entire surface of a contact area 14 of the pole shoe 7 and wherein the second contact area 13 rests over the entire surface of a contact area 15 of the shaft 5. The metal sheet 8 has an approximately constant thickness of at least 2 mm, in particular of approx. 5 mm, and consists of a second material 11, which is harder than the first material 10 and preferably also harder than the third material 30. A hardened spring steel C75s with a hardness in the range of 650 HV, in particular 700 HV, is preferably used as a second material 11. A hardness of this type is achieved by a heat treatment being carried out by means of hardening and annealing.

The pole shoes 7 are screwed onto the shaft 5 with the aid of connecting elements 16 (see FIG. 2 to FIG. 4) embodied as screws, wherein the metal sheet 8 is present between the shaft 5 and the pole shoes 7 and wherein the screws 16 run through the metal sheet 8. The screws 16 and the pole windings required for operation of the rotor 3 are not shown for reasons of clarity.

With an asynchronous start, eddy currents are induced into the pole shoes 7, wherein in particular the surface of the pole shoes 7 is heated significantly by the eddy currents, as a result of which the pole shoe 7 expands. In order to avoid a displacement of the pole shoe 7 toward the shaft 5, which is produced by the expansion, the contact areas 12, 13 of the metal sheet 8 have a roughening 9, wherein the surface roughness of the contact areas 12, 13 lies at more than 25 μm, in particular in the range of 60 μm to 80 μm. The frictional coefficient between the touching contact areas 12, 14; 13, 15 is increased by the greater surface roughness. Such a roughening 9 is achieved for instance by means of coarse blasting with a shot, for instance with particles. Alternatively, the contact areas 12, 13 can be structured by grinding, coining, milling and/or cutting such that the frictional coefficient between the touching contact areas 12, 14;

13, 15 is increased. The metal sheet 8 is produced by the roughening 9 being applied at least to the first contact area 12 after tempering by means of hardening and annealing.

The roughened contact areas 12, 13 of the metal sheet 8 comprising the harder second material 11 interlock on account of a corresponding contact pressure, which is generated by the screw connection, with the softer first material 10 of the pole shoe 7 and the softer third material 30 of the shaft 5.

Figure 2:
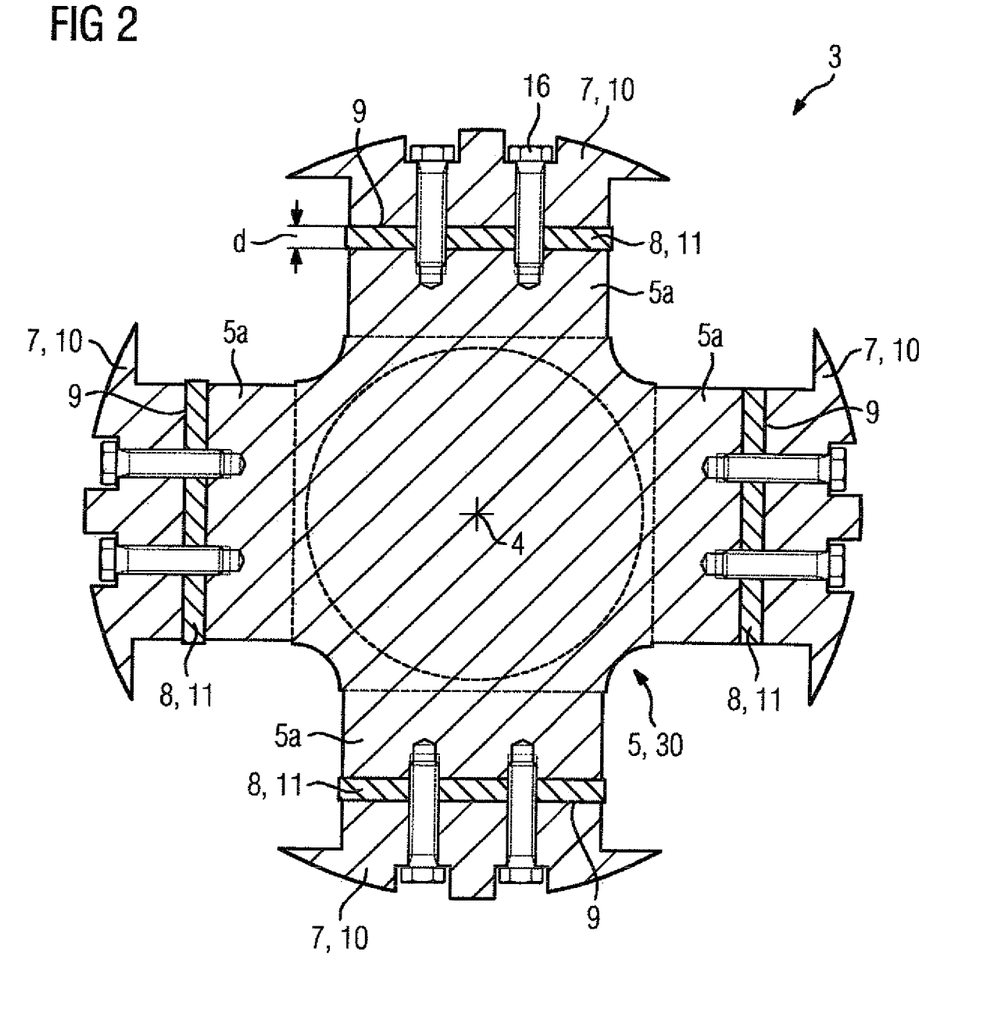
FIG. 2 shows a cross-section of a first embodiment of a rotor.

FIG. 2 shows a cross-section of a first embodiment of a rotor 3. Connecting elements 16, in particular screws, are shown, which run in the radial direction through the metal sheets 8 and fasten the pole shoes 7 together with the metal sheets 9 on the shaft 5. The remaining embodiment of the rotor 3 corresponds to that from FIG. 1.

Figure 3:
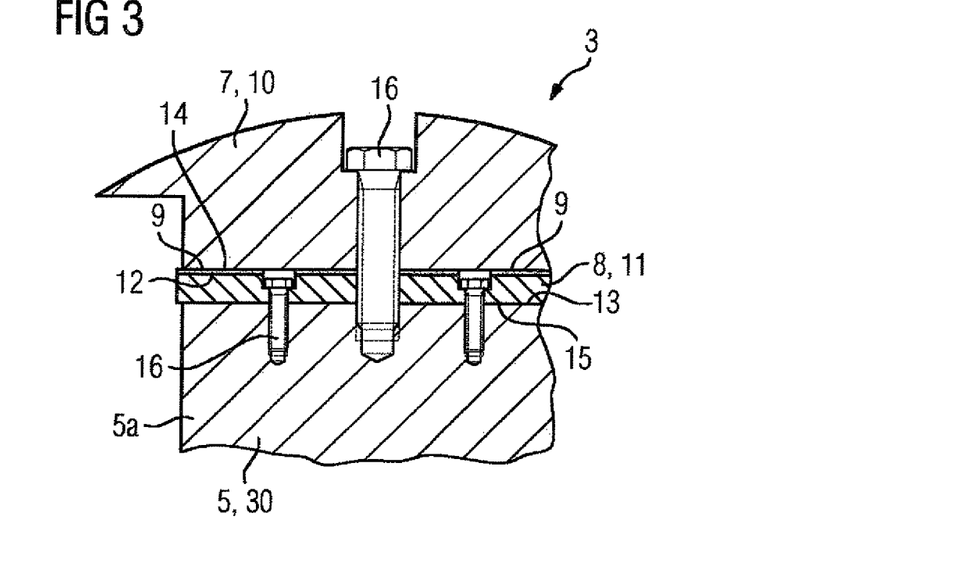
FIG. 3 shows a cross-section of an enlarged cutout of a second embodiment of a rotor.

FIG. 3 shows a cross-section through an enlarged cut-out of a second embodiment of a rotor 3. The first contact area 12 of the metal sheet 8 has, as described in FIG. 1, a roughening 9, in order to increase the friction between the metal sheet 8 and the pole shoe 7. With the shaft 5, by contrast, the metal sheet 8 is connected by way of connecting elements 16, in particular screws, so that the second contact area 13 rests on the contact area 15 of the shaft 5. The remaining embodiment of the rotor 3 corresponds to that from FIG. 1.

Figure 4:
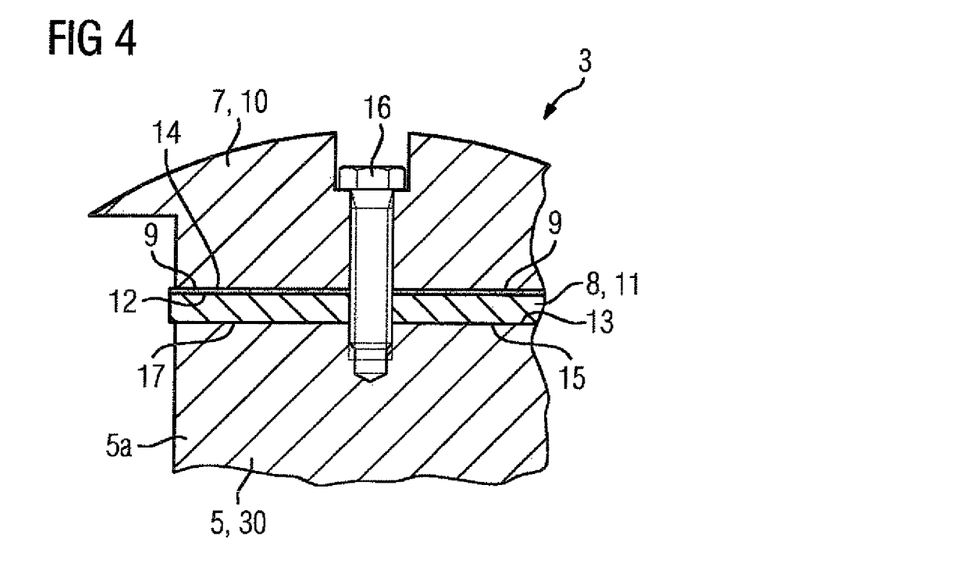
FIG. 4 shows a cross-section of an enlarged cutout of a third embodiment of a rotor and FIG. 5 shows a cross-section of an electric rotating machine.

FIG. 4 shows a cross-section through an enlarged cutout of a third embodiment of a rotor 3. The embodiment in FIG. 4 differs from the embodiment in FIG. 3 in that the second contact area 13 is connected by way of a positive-fit connection 17 with the contact area 15 of the shaft 5. A positive-fit connection 17 of this type is produced in particular by way of a welded connection, for instance by means of diffusion welding.

FIG. 5 shows a cross-section of an electric rotating machine 1, which is embodied as a synchronous machine 20. The synchronous machine 20, which can be operated with an output of at least 1 megawatt, has a rotor 3 according to one of the preceding figures. Furthermore, the synchronous machine 20 has a stator 2 surrounding the rotor 3, wherein an air gap 6 is disposed between the rotor 3 and the stator 2. The coils of the stator 2 and of the rotor 3 are not shown for the sake of clarity.

The invention claimed is:

1. A rotor for an electric rotating machine, in particular a synchronous machine, said rotor comprising:
    a shaft made of a first material;
    a pole shoe made of a second material which is different than the first material; and
    a metal sheet disposed between the shaft and the pole shoe and having a first contact area which is in contact with a contact area of the pole shoe, said first contact area of the metal sheet having a surface roughness which is greater than a surface roughness of the contact area of the pole shoe.

2. The rotor of claim 1, wherein the first contact area of the metal sheet has a surface roughness of more than 25 μm.

3. The rotor of claim 1, wherein the metal sheet is formed from a material having a hardness which is greater than a hardness of the pole shoe.

4. The rotor of claim 1, wherein the metal sheet is formed from a spring steel with a hardness of at least 650 HV.

5. The rotor of claim 1, wherein the metal sheet has a thickness of at least 2 mm.

6. The rotor of claim 1, wherein the first contact area of the metal sheet is hi full surface contact with the contact area of the pole shoe.

7. The rotor of claim 1, wherein the metal sheet is in contact with the shaft by way of a form-fit and/or force-fit connection, hi particular by way of a connecting element.

8. The rotor of claim 1, wherein the metal sheet is connected to the shaft by way of a positive-fit connection.

9. The rotor of claim 1, wherein the first contact area of the metal sheet has a surface roughness in a range of 60 μm to 80 μm.

10. The rotor of claim 1, wherein the metal sheet is connected to the shaft by way of a welded connection.

11. A rotor for an electric rotating machine, in particular a synchronous machine, said rotor comprising:
    a shaft made of a first material;
    a pole shoe made of a second material which is different than the first material; and
    a metal sheet disposed between the shaft and the pole shoe and having a first contact area which is in contact with a contact area of the pole shoe, said metal sheet having a second contact area which is in contact with a contact area of the shaft, said second contact area of the metal sheet having a surface roughness which is greater than a surface roughness of the contact area of the shaft.

12. The rotor of claim 11, wherein the first contact area of the metal sheet has a surface roughness of more than 25 μm.

13. The rotor of claim 11, wherein the metal sheet is formed from a material having a hardness which is greater than a hardness of the pole shoe.

14. The rotor of claim 11, wherein the metal sheet is formed from a spring steel with a hardness of at least 650 HV.

15. The rotor of claim 11, wherein the metal sheet has a thickness of at least 2 mm.

16. The rotor of claim 11, wherein the first contact area of the metal sheet is in full surface contact with the contact area of the pole shoe.

17. The rotor of claim 11, wherein the metal sheet is in contact with the shaft by way of a form-fit and/or force-fit connection, in particular by way of a connecting element.

18. The rotor of claim 11, wherein the metal sheet is connected to the shaft by way of a positive-fit connection.

19. The rotor of claim 11, wherein the first contact area of the meta/sheet has a surface roughness in a range of 60 μm to 80 μm.

20. The rotor of claim 11, wherein the metal sheet is connected to the shaft by way of a welded connection.

21. An electric rotating machine, in particular a synchronous machine, comprising a rotor, said rotor comprising a shaft made of a first material, a pole shoe made of a second material which is different than the first material, and a metal sheet disposed between the shaft and the pole shoe and having a first contact area which is in contact with a contact area of the pole shoe, said first contact area of the metal sheet having a surface roughness which is greater than a surface roughness of the contact area of the pole shoe.

22. An electric rotating machine, in particular a synchronous machine, comprising a rotor, said rotor comprising a shaft made of a first material, a pole shoe made of a second material which is different than the first material, and a metal sheet disposed between the shaft and the pole shoe and having a first contact area which is in contact with a contact area of the pole shoe, said metal sheet having a second contact area which is in contact with a contact area of the shaft, said second contact area of the metal sheet having a surface roughness which is greater than a surface roughness of the contact area of the shaft.

23. A method for producing a rotor for an electric rotating machine, in particular a synchronous machine, said method comprising:

placing a metal sheet between a pole shoe and a shaft of the electric rotating machine, with the metal sheet and the pole shoe being produced from different materials; and contacting a first contact area of the metal sheet with a contact area of the pole shoe, with the first contact area of the metal sheet having a surface roughness which is greater than a surface roughness of the contact area of the pole shoe.

24. The method of claim 23, wherein the first contact area of the metal sheet has a surface roughness of more than 25 μm.

25. The method of claim 23, wherein the metal sheet is formed from a material having a hardness which is greater than a hardness of the pole shoe.

26. The method of claim 23, wherein the metal sheet is formed from a spring steel with a hardness of at least 650 HV.

27. The method of claim 23, wherein the metal sheet has a thickness which is at least 2 mm.

28. The method of claim 23, wherein the first contact area of the metal sheet is in full surface contact with the contact area of the pole shoe.

29. A method for producing a rotor for an electric rotating machine, in particular a synchronous machine, said method comprising:

placing a metal sheet between a pole shoe and a shaft of the electric rotating machine, with the metal sheet and the pole shoe being produced from different materials;

contacting a first contact area of the metal sheet with a contact area of the pole shoe; and providing the metal sheet with a second contact area with a surface roughness which is greater than a surface roughness of a contact area of the shaft.

30. The method of claim 29, wherein the first contact area of the metal sheet has a surface roughness of more than 25 μm.

31. The method of claim 29, wherein the metal sheet is formed from a material having a hardness which is greater than a hardness of the pole shoe.

32. The method of claim 29, wherein the metal sheet is formed from a spring steel with a hardness of at least 650 HV.

33. The method of claim 29, wherein the metal sheet has a thickness which is at least 2 mm.

34. The method of claim 29, wherein the first contact area of the metal sheet is in full surface contact with the contact area of the pole shoe.

35. The method of claim 29, further comprising contacting a region of the second contact area of the metal sheet with the shaft by way of a form-fit and/or force-fit connection, in particular by way of a connecting element.

36. The method of claim 29, further comprising connecting the second contact area of the metal sheet to the shaft by way of a positive-fit connection.

* * * * *

UNITED STATES PATENT AND TRADEMARK OFFICE
CERTIFICATE OF CORRECTION

PATENT NO. : 11,101,706 B2
APPLICATION NO. : 16/080222
DATED : August 24, 2021
INVENTOR(S) : Stefan Schmidt, Benjamin Gottfried Ulbrich and Martin Wieschalla It is certified that error appears in the above-identified patent and that said Letters Patent is hereby corrected as shown below:

On the Title Page

Under (30) Foreign Application Priority Data:
Replace "EP 16157877" with -- EP 16157877.8 --.
Replace "EP 16158921" with -- EP 16158921.3 --.

In the Claims

In Column 5, Claim 6, Lines 66 replace "is hi full" with -- is in full --.
In Column 6, Claim 7, Lines 3 replace "hi particular" with -- in particular --.
In Column 6, Claim 19, Lines 42 replace "the meta/sheet" with -- the metal sheet --.

Signed and Sealed this
Ninth Day of November, 2021

Drew Hirshfeld
*Performing the Functions and Duties of the*
*Under Secretary of Commerce for Intellectual Property and*
*Director of the United States Patent and Trademark Office*